3,205,258
HERBICIDALLY ACTIVE UREAS
John V. Simonian, Greenwood, and Harry Kroll, Edgewood, R.I., and Janet B. Peterson, Yonkers, N.Y., assignors to Geigy Chemical Corporation, Ardsley, N.Y., a corporation of Delaware
No Drawing. Original application July 23, 1957, Ser. No. 673,562, now Patent No. 3,134,663, dated May 26, 1964. Divided and this application July 14, 1958, Ser. No. 751,589
13 Claims. (Cl. 260—465)

This is a division of application Serial No. 673,562, filed July 23, 1957, now U.S. Patent No. 3,134,663.

This invention relates to new herbicidally active polysubstituted ureas. The invention relates further to methods for the preparation of the said polysubstituted ureas. Finally, the invention also relates to compositions containing these new substituted ureas and which may be used for killing or inhibiting the growth of weeds or undesired plants.

Trisubstituted ureas such as 3-(m-chlorophenyl)-1,1-dimethyl urea have been successfully used as pre- and post-emergence herbicides, but despite the favorable control of such obnoxious weeds as Johnson grass, Bermuda grass, nut grass, and quack grass, these urea derivatives have certain shortcomings when used for controlling weeds in agricultural crops. The major disadvantage of these compounds is their slow rate of decomposition, and their tendency to migrate in the soil to areas other than the immediate zone of application.

It is an object of this invention to provide new herbicidal compounds which can be formulated into compositions to provide effective control of weeds and obnoxious grasses, such as those precedingly mentioned and including broadleaf plantain (*Plantago major*), crabgrass (*Digitaria sanguinatis*), redroot pigweed (*Amoranthus retroflexus*), mustard (Brassica), etc., without imparting to the soil long-lasting herbicidal properties and without injuring desired vegetation, as for example desired cotton, corn, or pea crops.

The polysubstituted ureas of this invention whereby the said object may be represented by the following formula:

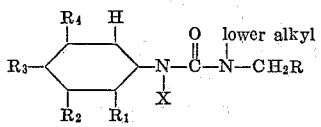

wherein R signifies carboxy (—COOH), lower carbalkoxy (e.g. —COOC$_2$H$_5$, etc.) or cyano (—CN—), R$_1$, R$_2$, R$_3$ and R$_4$ severally signify a hydrogen atom, a halogen atom such as chlorine, bromine or fluorine, a lower alkyl group, a lower alkoxy group, a haloalkyl group (e.g. trifluoromethyl), a lower acylamino group, a lower alkylamino group, a lower dialkylamino group or a nitro group, and X signifies H or a lower alkyl group, "lower alkyl" signifying a methyl, ethyl, propyl, butyl, etc. group. The aromatic constituent of the urea derivative contains a hydrogen on at least one carbon atom ortho to the adjacent urea nitrogen.

Illustrative of the herbicidal compounds which fall within the scope of the invention are:

3-(o-chlorophenyl)-1-methyl-1-cyanomethylurea;
3-(p-chlorophenyl)-1-methyl-1-cyanomethylurea;
3-(m-chlorophenyl)-1-methyl-1-cyanomethylurea;
3-(3,4-dichlorophenyl)-1-methyl-1-cyanomethylurea;
3-(p-nitrophenyl)-1-methyl-1-cyanomethylurea,
3-(2,4-dichlorophenyl)-1-methyl-1-cyanomethylurea;
3-(2,4,5-trichlorophenyl)-1-methyl-1-cyanomethylurea;
3-(m-chlorophenyl)-1-ethyl-1-cyanomethylurea;
3-(3,4-dichlorophenyl)-1-sec.propyl-1-cyanomethylurea;
3-(p-chlorophenyl)-1-tert.butyl-1-cyanomethylurea;
3 - (3-chloro-4-methylphenyl)-1-methyl - 1 - cyanomethylurea;
3-(m-tolyl)-1-methyl-1-cyanomethylurea;
3-(p-tolyl)-1-methyl-1-cyanomethylurea;
3-(3,4-dimethylphenyl)-1-methyl-1-cyanomethylurea;
3-(p-chlorophenyl)-1-sec.propyl-1-cyanomethylurea;
3-(p-methoxyphenyl)-1-methyl-1-cyanomethylurea;
3-(2,5-dimethoxyphenyl)-1-methyl-1-cyanomethylurea;
3-phenyl-1,3-dimethyl-1-cyanomethylurea;
3-(3-trifluoromethyl-4-chlorophenyl)-1-methyl - 1 - cyanomethylurea;
3-(p-acetylaminophenyl)-1-methyl-1-cyanomethylurea;
3-(p-dimethylaminophenyl) - 1 - methyl - 1 - cyanomethylurea;
3-(p-fluorophenyl)-1-methyl-1-cyanomethylurea;
3-(3,4-dichlorophenyl)-1-sec.propyl-1-cyanomethylurea;
3 - (2,4 - dichlorophenyl) - 1 - methyl - 1 - carbethoxymethylurea;
3-(p-chlorophenyl)-1-methyl-1-carbethoxymethylurea;
3 - (2,5-dichlorophenyl)-1-methyl - 1 - carbethoxymethylurea;
3-(o-chlorophenyl)-1-methyl-1-carbethoxymethylurea;
3-(p-chlorophenyl)-1-methyl-1-carboxymethylurea; etc.

The 1,3-substituted ureas of the present invention can be prepared by the reaction of aromatic isocyanates with lower alkylaminoacetonitriles or appropriate derivatives (e.g. alkyl esters) thereof. They may also be prepared by the action of cyanomethylcarbamyl chloride on the appropriate aromatic amine in the presence of an acid acceptor such as triethylamine, pyridine, or dimethyl aniline. Inert solvents may be employed, e.g. dry benzene, toluene, chlorobenzene, dioxane, etc.

The following reactions illustrate the process:

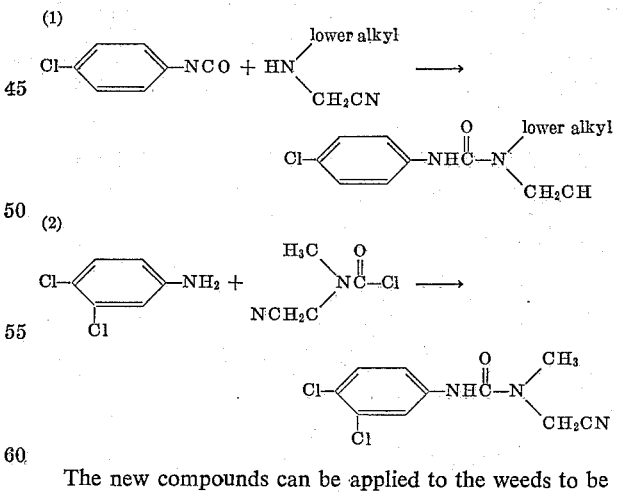

The new compounds can be applied to the weeds to be eradicated and/or to the soil to be kept free of weeds, in a variety of ways, but preferably in association with a carrier. Thus, an active compound of the invention may be associated in finely-divided form with a dustforming auxiliary, such as talc, fuller's earth or the like, the resultant composition being applied as a dust. Alternatively the active compound may be associated with a dispersing agent or mixture which is dispersible in water, whereby the admixed component according to the invention may be applied in spray form (e.g. as an aqueous suspension). The active compound may also be used in solution in an appropriate solvent. In each case, the composition as used contains an effective quantity or proportion of active compound.

Representative presently-preferred embodiments of the present invention are set forth in the following illustrative examples wherein the parts and percentages are by weight.

EXAMPLE 1

*3-(o-chlorophenyl)-1-methyl-1-cyanomethylurea*

A solution of 98.6 parts of o-chlorophenyl isocyanate in 100 parts of benzene is added dropwise, at a rate to maintain the temperature at 40–50° C., to a mixture of 45 parts of sarcosine nitrile and 100 parts of dry benzene. After complete addition the temperature is maintained at reflux for 3 hours. The homogeneous mixture is cooled to room temperature (about 20 to about 30° C.) and enough ligroin added to make it slightly turbid. This mixture is allowed to cool in the refrigerator overnight. The separated solid is filtered and dried in vacuo. In this manner 138 parts of the desired product, 3-(o-chlorophenyl) - 1 - methyl - 1 - cyanomethylurea, are obtained. M.P. 87.5–88.5° C.

EXAMPLE 2

*3-(p-chlorophenyl)-1-methyl-1-cyanomethylurea*

To a mixture of 35 parts of sarcosine nitrile in 200 parts of benzene is added a solution of 76.8 parts of p-chloro-phenyl isocyanate in 100 parts of benzene at a rate to maintain the temperature at 40–50° C. The mixture is allowed to react for 2 hours at 40–50° C. and then cooled to room temperature and placed in the refrigerator overnight. The separated solid is filtered and dried in vacuo. The yield is 101 parts (90%) of the desired product, 3-(p-chlorophenyl) - 1 - methyl-1-cyanomethylurea. M.P. 92–96° C.

EXAMPLE 3

*3-(m-chlorophenyl)-1-methyl-1-cyanomethylurea*

A solution containing 35 parts of sarcosine nitrile in 100 parts of benzene is added dropwise to a mixture of 76.8 parts of m-chlorophenyl isocyanate in 100 parts of benzene. The mixture is allowed to react for 2 hours at 60–70° C. and then cooled to room temperature and placed in a cooler overnight. The solid that separates is filtered and dried in vacuo. In this manner 107 parts of a white solid, 3-(m-chloro-phenyl) - 1 - methyl - 1-cyanomethylurea, are obtained. M.P. 96.5–98.5° C.

EXAMPLE 4

*3-(3,4-dichlorophenyl)-1-methyl-1-cyanomethylurea*

A solution of 75.2 parts of 3.4 dichlorophenyl isocyanate in 100 parts of dry benzene is added dropwise with stirring to 28 parts of N-methylaminoacetonitrile in 200 parts of dry benzene. The reaction mixture is maintained at 40–50° C. and in 15 minutes after complete addition a white crystalline product, 3-(3,4 - dichlorophenyl) - 1-methyl-1-cyanomethylurea, has precipitated and is separated and dried in a vacuum desiccator. The yield is 102 parts (99%). M.P. 104–107° C.

EXAMPLE 5

*3-(2,4,5-trichlorophenyl)-1-methyl-1-cyanomethylurea*

A solution of 2,4,5-trichlorophenyl isocyanate (32.3 parts) in 100 parts of dry benzene is added at a rate to maintain the temperature at 40–50° C. to a solution of sarcosine nitrile (7 parts) in 100 parts of dry benzene. The mixture is heated at 40–50° C. for 3 hours. On cooling, the product separates as a white crystalline material, 3-(2,4,5-trichlorophenyl)-1-methyl-1-cyanomethylurea. Yield 75%.

EXAMPLE 6

*3-(2,4-dichlorophenyl)-1-methyl-1-cyanomethylurea*

A solution of 57 parts of 2,4-dichlorophenyl isocyanate (prepared by the general method described in the literature, Vittenet, Bull., Soc. Chem. (3), 21, 586, 954 (1899); Org. Synthesis, Coll. Vol. II, p. 453; and U.S. Patent No. 2,428,843) in 130 parts of dry benzene is added, at a rate to maintain the temperature at 40–50° C., to a solution of 21 parts of N-methyl-aminoacetonitrile in 150 parts of dry benzene. The reaction is continued at 40–50° C. for 1½ hours. The reaction mixture is first cooled to room temperature and then cooled in the refrigerator, and crystallization of the product is induced when the sides of the reaction vessel are scratched. The separated solid (36 parts) is filtered and dried in vacuo. The filtrate which evaporates somewhat during the filtration is warmed and enough ligroin is added to make it turbid. The mixture is cooled in the refrigerator and the second crop (18 parts) filtered and dried. The total yield of the desired product, 3 - (2,4 - dichlorophenyl) - 1 - methyl-1-cyanomethylurea, is 54 parts (70% of theory). M.P. (first crop) 120–126° C.

Alternatively, a solution of 75.2 parts of 2,4-dichlorophenyl isocyanate in 100 parts of dry benzene is added, at a rate to maintain the temperature at 40–50° C., to a solution of sarcosine nitrile in dry benzene. The reaction is continued at 40–50° C. for 2 hours and the reaction mass then cooled in a refrigerator. The solid that separates is filtered and dried. It is the desired 3-(2,4-dichlorophenyl)-1-methyl-1-cyanomethylurea.

EXAMPLE 7

*3-(m-tolyl)-1-methyl-1-cyanomethylurea*

A solution of 66.5 parts of m-tolyl isocyanate in 105 parts of anhydrous ether is added over a period of ¾ hour to a solution of 35 parts of sarcosine nitrile in 105 parts of anhydrous ether at a temperature of 20–30° C. It is necessary to employ a cooling bath to maintain this temperature. The reaction is continued at 25–30° C. for another half hour and then cooled in ice. The product precipitates at first as a colorless oil with a small amount of solid.

The ether solution is decanted from the oily residue and the residue washed with ether. The residue is treated with 100 parts of benzene, the mixture is warmed to 40–50° C. and treated with 75 parts of ligroin and the solution is filtered warm from the small amount of solid. The solvents are removed in vacuo at 40–60° C. In this manner, 70 parts (63%) of 3-(m-tolyl)-1-methyl-1-cyanomethylurea are obtained as a viscous orange-yellow syrup.

EXAMPLE 8

*3-(p-tolyl)-1-methyl-1-cyanomethylurea*

A solution of 66.5 parts of p-tolyl isocyanate in 130 parts of benzene is added dropwise to a solution of 35 parts of sarcosine nitrile in 130 parts of benzene over a period of ½ hour. The reaction mixture is maintained at 40–50° C. during the addition and for 1½ hours after the addition is complete. The reaction mass is cooled to room temperature and then in ice, and the solid (35 parts) that has separated is filtered and dried in vacuo. A second crop (38 parts) is obtained by treatment of the filtrate warm (40–50° C.) with 65–95 parts of ligroin, cooling, filtration and drying. A third crop (23 parts) is obtained, as an orange-yellow syrup, by evaporation of the filtrate to dryness in vacuo at 40–55° C. The first crop reverts to a viscous syrup after drying. The second crop remains crystalline. The total yield of 3-(p-tolyl)-1- methyl-1-cyanomethylurea is 96 parts (or 94.5%). M.P. (second crop) 120–128° C.

EXAMPLE 9

*3-(3,4-dimethylphenyl)-1-methyl-1-cyanomethylurea*

To a solution of 16.7 parts of sarcosine nitrile in 44 parts of benzene is added, dropwise, a solution of 33.3 parts of 3,4-dimethylphenyl isocyanate in 250 parts of chlorobenzene over a period of ¾ hour while the reaction temperature is maintained at 35–45° C. The white, crystalline 3 - (3,4-dimethylphenyl)-1-methyl-1-cyanomethylurea precipitataes almost immediately. The reaction mixture is maintained at 35–45° C. for 1½ hours after complete addition and is then cooled to room temperature and in ice and the solid filtered and dried in vacuo. The yield is 45.5 parts (91%). M.P. 153–155° C.

EXAMPLE 10

*3-(p-chlorophenyl)-1-sec.propyl-1-cyanomethylurea*

Sixty-three parts of p-chlorophenyl isocyanate in 66 parts of benzene are allowed to react with 40 parts of N-sec.propylaminoacetonitrile (prepared by the method described in the literature, Cook et al., J. Chem. Soc. 2334, 1949) in 150 parts of benzene as described in Example 11. The white crystalline 3-(p-chlorophenyl)-1-sec.propyl-1-cyanomethylurea, 70 parts (63.5%), obtained by filtration of the cooled reaction mixture becomes a sticky mass after drying. The syrup, thus obtained, is triturated and washed with ether. The first crop (42 parts), crystalline at first, reverts to a viscous syrup after standing a short time at room temperature. A second crop (28 parts) is obtained crystalline by evaporation of the combined ether and benzene filtrates to dryness in vacuo at 40–50° C., trituration and washing of the partly crystalline residue with ether, filtration, and drying. M.P. (second crop) 88–96° C.

EXAMPLE 11

*3-(3,4-dichlorophenyl)-1-sec.propyl-1-cyanomethylurea*

Seventy-seven parts of 3,4-dichlorophenyl isocyanate in 130 parts of benzene are allowed to react with 40 parts of N-sec.propylaminoacetonitrile in 160 parts of benzene as described in Example 9. The product does not crystallize from the cooled reaction mixture. The benzene solvent is removed in vacuo at 40–50° C. and the product, 3-(3,4-dichlorophenyl)-1-sec.propyl-1-cyanomethylurea, is obtained as a viscous light yellow syrup which crystallizes on long standing in the refrigerator.

EXAMPLE 12

*3-(p-methoxyphenyl)-1-methyl-1-cyanomethylurea*

A solution of 35 parts of sarcosine nitrile in 110 parts of benzene is treated with a solution of 74.5 parts of p-methoxyphenyl isocyanate in 66 parts of benzene as described in Example 9. A first crop (31.5 parts) of 3-(p-methoxy-phenyl)-1-methyl-1-cyanomethyurea is obtained when the reaction mass is cooled in the refrigerator for several days, and the separated white solid is filtered and dried in vacuo. A second crop (70 parts) of the desired product is obtained as a white solid by treatment of the filtrate with 95 parts of ligroin, cooling of the precipitated oil in the refrigerator, seeding, scratching, and subsequent filtration and drying. The total yield of 3-(p-methoxyphenyl)-1-methyl - 1 - cyanomethylurea is 101.5 parts (92.5%), M.P. (second crop) 104–112° C.

EXAMPLE 13

*3-(2,5-dimethoxyphenyl)-1-methyl-1-cyanomethylurea*

A suspension of 60 parts of 2,5-dimethoxyphenyl isocyanate in 97 parts of benzene is added in large portions over a period of ½ hour to a stirred solution of 26.2 parts of sarcosine nitrile in 79 parts of benzene. The reaction mixture is maintained at 40–50° C. during the addition and for 1½ hours after the addition is complete. At the end of this time the reaction mass is cooled to room temperature and the precipitated white, crystalline solid is filtered and dried in vacuo. The yield is 75 parts (86%) of the desired product, 3-(2,5-dimethoxyphenyl)-1-methyl-1-cyanomethylurea. M.P. 136–141° C.

EXAMPLE 14

*3-phenyl-1,3-dimethyl-1-cyanomethylurea*

A solution of 53 parts of N-methyl-N-cyanomethyl-carbamyl chloride in 44 parts of benzene is added dropwise over a period of ½ hour to a stirred solution of 42.8 parts of N-methylaniline and 31.6 parts of pyridine in 185 parts of benzene while the temperature of the reaction mixture is maintained at 40–50° C. The reaction is continued at 40–50° C. for 2 hours after the addition is complete, and is then cooled. The insoluble pyridine hydrochloride (42 parts) is filtered from the benzene solution and the filtrate washed with 1-normal hydrochloric acid (80 parts in two portions), water (60 parts in two portions), 5% sodium carbonate (60–80 parts in two portions) and water (60 parts in two portions) in that order. The benzene solution is separated and dried over anhydrous sodium sulfate, filtered, and the benzene removed completely in vacuo at 40–50° C. The residue, which is the desired 3-phenyl-1,3-dimethyl-1-cyanomethylurea, is obtained as a light amber syrup. The yield is 67.5 parts (83%).

The N-methyl-N-cyanomethyl-carbamyl chloride may be prepared as follows:

To 1500 parts of dry xylene cooled to below 10° C. are added 645 parts of liquid phosgene. A mixture of sarcosine nitrile (308 parts) in 500 parts of dry xylene and pyridine (348 parts) in 500 parts of dry xylene is added dropwise to the phosgene solution at temperatures below 15° C. After complete addition the mixture is placed in refrigerator overnight. The pyridine hydrochloride formed is filtered (415 parts). The xylene solvent is cautiously distilled from the filtrate into traps containing 25% sodium hydroxide in the traps. The residue is then distilled under reduced pressure, B.P. 124–137° C. at 18–17 mm. Hg, $n_D^{25}$ 1.485, and the product, N-methyl-N-cyanomethyl-carbamyl chloride, is obtained in a yield of 515 parts (88.5%).

EXAMPLE 15

*3-(3-trifluoromethyl-4-chlorophenyl)-1-methyl-1-cyanomethylurea*

A solution of 54.7 parts of 3-trifluoromethyl-4-chloroaniline and 22.1 parts of pyridine in 145 parts of benzene is treated with a solution of 37.1 parts of N-methyl-N-cyanomethylcarbamyl chloride in 44 parts of benzene as described in Example 14. The product and pyridine hydrochloride precipitate together as an insoluble viscous, oily phase and the latter is separated from the benzene layer and stirred with 50 parts of water. The product, 3-(3 - trifluoromethyl-4-chlorophenyl)-1-methyl-1-cyanomethylurea which crystallizes with scratching, is filtered, washed well with water until chloride ion is no longer present in the wash water, and dried in vacuo. The yield is 72.5 parts (89%). M.P. 139–143° C.

EXAMPLE 16

*3-(p-acetylaminophenyl)-1-methyl-1-cyanomethylurea*

To a stirred, partially dissolved suspension of 45.1 parts of p-aminoacetanilide and a solution of 23.7 parts of pyridine in 220 parts of dioxane is added, dropwise, a solution of 39.8 parts of N-methyl-N-cyanomethylcarbamyl chloride in 52 parts of dioxane over a period of ½ hour. The temperature of the reaction mixture is maintained at 50–60° C. during the addition and at 45–55° C. for 2 hours after the addition is complete. The reaction mixture is cooled and the precipitated mushy solid, a mixture of pyridine hydrochloride and the product, is filtered and washed with 50 parts of water on the filter. The product, 3-(p-acetylaminophenyl)-1-methyl- 1-cyanomethylurea, crystallizes in the filter and the pyridine hydrochloride is washed through. The product on the filter is washed well with water until chloride ion is no longer present in the wash water and dried in vacuo. The yield is 59.5 parts (80.5%). M.P. 176–177° C. (evol. of gas).

EXAMPLE 17

3-(p-dimethylaminophenyl)-1-methyl-1-cyanomethylurea

A solution of 23 parts of N,N-dimethyl-p-phenylenediamine and 15.3 parts of triethylamine in 105 parts of benzene is treated with a solution of 20 parts of N-methyl-N-cyanomethylcarbamyl chloride in 35 parts of benzene as described in Example 14. The pyridine hydrochloride which has precipitated is filtered, and during this process the product, 3-(p-dimethylaminophenyl)-1-methyl-1-cyanomethylurea, crystallizes from the filtrate. The latter is filtered and both substances are dried in vacuo. The crude product (25 parts) is freed from contaminating pyridine hydrochloride by trituration with 50–60 parts of water, filtration, thorough washing with water (until the wash water is free of chloride ion), and drying in vacuo. Some additional product (3 parts) is recovered from the pyridine hydrochloride fraction (21.5 parts) when the latter is dissolved in 25 parts of water and the insoluble product is filtered, washed well with water and dried in vacuo. In this manner 25 parts of pure product are obtained (72% of theory). M.P. 122–124.5° C. Neutral equivalent: 232.

EXAMPLE 18

3-(p-fluorophenyl)-1-methyl-1-cyanomethylurea

A solution of 14.2 parts of p-fluoroaniline and 10.1 parts of pyridine in 88 parts of benzene is treated with a solution of 17 parts of N-methyl-N-cyanomethylcarbamyl chloride in 22 parts of benzene as described in Example 14 except that the addition is complete in 15 minutes. The crystalline solid formed, a mixture of pyridine hydrochloride and the product, is filtered and sucked as dry as possible. The solid is then triturated with water thoroughly, filtered, washed well with water until the wash is free of chloride ion, and dried in vacuo. In this manner 23.5 parts (89% of theory) of the desired 3-(p-fluorophenyl)-1-methyl-1-cyanomethylurea are obtained. M.P. 127–129° C.

EXAMPLE 19

3-(2,4-dichlorophenyl)-1-methyl-1-carbethoxymethylurea

A solution of 35.8 parts of 2,4-dichlorophenylisocyanate in 53 parts of benzene is added in portions over a period of 15 minutes to a solution of 22.2 parts of sarcosine ethyl ester in 53 parts of benzene. The reaction temperature is maintained between 10° C. and 25° C. The reaction mixture is allowed to stand overnight at room temperature and the solution obtained is treated with 410 parts of ligroin and cooled in the refrigerator. The product, 3-(2,4-dichlorophenyl)-1-methyl-1-carbethoxymethylurea, which precipitates as white needles, is filtered and dried in vacuo. The yield is 46 parts (79.5%). M.P. 59–60.5° C.

EXAMPLE 20

3-(p-chlorophenyl)-1-methyl-1-carbethoxymethylurea

The reaction of 30.7 parts of p-chorophenyl isocyanate in 44 parts of benezene with 23.4 parts of sarcosine ethyl ester in 44 parts of benzene is carried out as described in Example 19. In the present example, however, 60–70 parts of ligroin are employed to precipitate the desired 3-(p-chlorophenyl)-1-methyl-1-carbethoxymethylurea. The yield is 49 parts (90.5%). M.P. 115.5–118° C.

EXAMPLE 21

3-(2,5-dichlorophenyl)-1-methyl-1-carbethoxymethylurea

The reaction of 35.8 parts of 2,5-dichlorophenyl isocyanate in 44 parts of benzene with 22.2 parts of sarcosine ethyl ester in 44 parts of benzene is carried out as described in Example 20. The yield of 3-(2,5-dichlorophenyl)-1-methyl-1-carbethoxymethylurea is 50 parts (86%). M.P. 81–82° C.

EXAMPLE 22

3-(o-chlorophenyl)-1-methyl-1-carbethoxymethylurea

The reaction of 27.6 parts of o-chlorophenyl isocyanate in 44 parts of benzene with 20.8 parts of sarcosine ethyl ester in 44 parts of benzene is carried out as described in Example 19. In this example, however, 315 parts of ligroin and 70 parts of ether are employed to precipitate the desired 3-(o-chlorophenyl)-1-methyl-1-carbethoxymethylurea which comes out as a colorless, rather viscous oil. The oil is separated from the solvent phase and dried in vacuo. The yield is 16 parts (33%).

EXAMPLE 23

3-(p-chlorophenyl)-1-methyl-1-carboxymethylurea

To a stirred solution of 31.2 parts of sarcosine and 23 parts of 85% potassium hydroxide in 280 parts of water are added, dropwise, 53.7 parts of p-chlorophenyl isocyanate over a period of ½ hour. The temperature of the reaction mixture is maintained at 5–10° C. during the addition by means of an ice bath. The reaction is continued for 5 hours after the addition is complete at 5–10° C., then the ice bath is removed and the reaction mixture is allowed to stand at room temperature overnight. The alkaline solution is filtered from a small amount of insoluble material (about 1 part) and is then neutralized with 6-normal hydrochloric acid at 10–15° C. The desired 3 - (p - chlorophenyl)-1-methyl-1-carboxymethylurea acid oils out as a white syrup at first but slowly crystallizes with constant scratching. The white solid is filtered and dried in vacuo. The yield is 80 parts (93%). M.P. 127–128.5° C. (evolution of gas).

EXAMPLE 24

This example is illustrative of a method of using the compounds of the present invention.

A newly-seeded cotton patch is sprayed—advantageously on the day after seeding—with an aqueous dispersion of 3-phenyl-1-methyl-1-cyanomethylurea at a dosage rate of about 4 pounds of active urea per acre. Any weeds, such as crabgrass, broadleaf plantain, redroot pig weed or the like, which sprout will be effectively destroyed and completely eradicated within a period of 14 to 28 days. Emergent cotton will be and will remain totally unharmed at this effective weed-controlling dosage level.

Other active compounds of the invention—e.g. 3-(3,4-dichlorophenyl)-1-methyl-1-cyanomethylurea, etc.—may be used in lieu of the 3-phenyl-1-methyl-1-cyanomethylurea with essentially the same results.

Effective control may also be realized with dosages as low as 2 pounds of active compound per acre. Even a dosage rate as low as 1 pound per acre may achieve a 79%–90% destruction of weeds within 28 days. The cotton remains unharmed throughout.

EXAMPLE 25

The specificity of the new compounds of this invention is illustrated by their ability to kill e.g. mustard (Brassica) a very common weed in many crops, and not damage e.g. corn or peas. In contrast to these new substances, known herbicides such as 3-(p-chlorophenyl)-1,1-dimethylurea will destroy the crop plants as well as the weeds.

Ten seeds each of corn, peas and mustard are planted in soil flats at a depth of 3 centimeters. The flats are then sprayed with a dispersion of the test compounds at a dosage rate of 10 pounds of active ingredient per acre. A count of plant stand is taken after 28 days. The tests are performed in duplicate and the table below lists the average values.

| Compound | Percentage of Plants Killed | | |
|---|---|---|---|
| | Corn | Peas | Mustard |
| | Percent | Percent | Percent |
| A | 0 | 0 | 100 |
| B | 0 | 0 | 90 |
| C | 0 | 0 | 70 |
| D | 100 | 100 | 100 |

A=3-phenyl-1-methyl-1-cyanomethylurea.
B=3-(3,4-dichlorophenyl)-1-methyl-1-cyanomethylurea.
C=3-(m-chlorophenyl)-1-methyl-1-cyanomethylurea.
D=3-(p-chlorophenyl)-1,1-dimethylurea.

Having thus disclosed the invention what is claimed is:

1. A compound of the formula

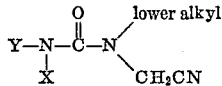

wherein X is a member selected from the group consisting of H and lower alkyl, and Y is a member selected from the group consisting of 3,4-dichlorophenyl, 2,4,5-trichlorophenyl, 2,4-dichlorophenyl, 3,4-dimethylphenyl, p-methoxyphenyl, 2,5-dimethoxyphenyl, 3-trifluoromethyl-4-chlorophenyl, p-acetylaminophenyl, p-dimethylaminophenyl, p-fluorophenyl, p-nitrophenyl, and 3-chloro-4-methylphenyl.

2. 3-(3,4-dichlorophenyl)-1-methyl - 1 - cyanomethylurea.
3. 3-(p-nitrophenyl)-1-methyl-1-cyanomethylurea.
4. 3-(2,4,5 - trichlorophenyl)-1-methyl-1-cyanomethylurea.
5. 3 - (3,4-dichlorophenyl)-1-sec.propyl-1-cyanomethylurea.
6. 3 - (3-chloro-4-methylphenyl)-1-methyl - 1 - cyanomethylurea.
7. 3-(3,4-dimethylphenyl)-1-methyl - 1 - cyanomethylurea.
8. 3-(p-methoxyphenyl)-1-methyl-1-cyanomethylurea.
9. 3 - (2,5-dimethoxyphenyl)-1-methyl-1-cyanomethylurea.
10. 3 - (3-trifluoromethyl-4-chlorophenyl)-1-methyl-1-cyanomethylurea.
11. 3-(p-acetylaminophenyl)-1-methyl - 1 - cyanomethylurea.
12. 3 - (p - dimethylaminophenyl)-1-methyl-1-cyanomethylurea.
13. 3-(p-fluorophenyl)-1-methyl-1-cyanomethylurea.

References Cited by the Examiner
UNITED STATES PATENTS

| | | | |
|---|---|---|---|
| 2,095,457 | 10/37 | Steindorff et al. | 260—518 |
| 2,562,011 | 7/51 | Baumgartner | 71—2.7 |
| 2,572,568 | 10/51 | Gluesenkamp | 260—2.5 |
| 2,655,447 | 10/53 | Todd | 71—2.6 |
| 2,687,348 | 8/54 | Kosmin | 71—2.7 |
| 2,760,971 | 8/56 | Surrey | 260—465 |
| 3,020,144 | 2/62 | Gobeil et al. | |
| 3,020,145 | 2/62 | Gobeil et al. | |

OTHER REFERENCES

Beilstein's Handbuch der Organischen Chemie, volume 12, 1929, page 362.
Cook et al.: C.A., 47, 1953, p. 8737–F.
Siefken: "Chemical Abstracts," page 111b, 1950, volume 44.
Tarbell et al.: J.A.C.S., 68, 1217–1219, July 1946.
Thompson et al: "The Botanical Gazette," page 505, 1946, volume 107

CHARLES B. PARKER, *Primary Examiner.*

LEON ZITVER, *Examiner.*